(12) United States Patent
Franceschelli, Jr. et al.

(10) Patent No.: US 7,810,034 B2
(45) Date of Patent: *Oct. 5, 2010

(54) BACKUP REPORTING FRAMEWORK GRAPHICAL USER INTERFACE

(75) Inventors: Anthony J. Franceschelli, Jr., Norton, MA (US); Jeffrey S. Phillips, Northbridge, MA (US); Peter Bouchard, Northbridge, MA (US); Serena Doyle, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 429 days.

This patent is subject to a terminal disclaimer.

(21) Appl. No.: 12/015,073

(22) Filed: Jan. 16, 2008

(65) Prior Publication Data

US 2008/0134050 A1   Jun. 5, 2008

Related U.S. Application Data

(63) Continuation of application No. 10/109,013, filed on Mar. 28, 2002, now Pat. No. 7,350,149.

(51) Int. Cl.
*G06F 15/177* (2006.01)
(52) U.S. Cl. ..................................... 715/736
(58) Field of Classification Search ................ 715/734, 715/735, 738, 760, 762
See application file for complete search history.

(56) References Cited

U.S. PATENT DOCUMENTS

| | | | |
|---|---|---|---|
| 5,329,619 A | 7/1994 | Page et al. | |
| 5,455,953 A | 10/1995 | Russell | |
| 5,553,242 A | 9/1996 | Russell et al. | |
| 5,761,507 A | 6/1998 | Govett | |
| 5,864,669 A | 1/1999 | Osterman et al. | |
| 6,067,580 A | 5/2000 | Aman et al. | |
| 6,144,999 A | 11/2000 | Khalidi et al. | |
| 6,163,856 A | 12/2000 | Dion et al. | |
| 6,202,089 B1 | 3/2001 | Juster | |

(Continued)

OTHER PUBLICATIONS

Kirch, Olaf, "NFS File Locking," published Jul. 15, 1995, 4 pages.

(Continued)

*Primary Examiner*—Thanh T Vu
(74) *Attorney, Agent, or Firm*—Daly, Crowley, Mofford & Durkee, LLP

(57) ABSTRACT

A backup reporting framework Graphical User Interface (GUI) comprises a combination of components that make it possible to display a Reporting GUI to the customer on the customer's desktop. The framework includes three main components, a server component, a wag-server middleware component, and a monitor server middleware component. The Server Component handles all the operations necessary to start the GUI or Command Line Interface (CLI) interaction with the Middleware Components. The WAG Server Middleware component provides a mechanism for the client application to interact with the server. The WAG Server component gives the client side applications access to data resident on the server and allow for command and control from the client side. The monitor server middleware component also provides a mechanism for the client application to interact with the server. It gives the client side application access to data resident on the server and allows for command and control from the client side. The middleware allows the GUI to get data about the current state of EDM, and display the information graphically.

26 Claims, 5 Drawing Sheets

U.S. PATENT DOCUMENTS

| | | |
|---|---|---|
| 6,247,057 B1 | 6/2001 | Barrera, III |
| 6,377,993 B1 | 4/2002 | Brandt et al. |
| 6,453,362 B1 | 9/2002 | Bittinger et al. |
| 6,539,494 B1 | 3/2003 | Abramson et al. |
| 6,539,949 B2 | 4/2003 | Christensen |
| 6,574,661 B1 | 6/2003 | Delano et al. |
| 6,621,505 B1 | 9/2003 | Beauchamp et al. |
| 6,631,402 B1 | 10/2003 | Devine et al. |
| 6,684,229 B1 * | 1/2004 | Luong et al. ............... 1/1 |
| 6,757,698 B2 * | 6/2004 | McBride et al. ............ 1/1 |
| 7,043,732 B2 | 5/2006 | Mandal et al. |
| 7,107,534 B1 | 9/2006 | de Jong et al. |
| 7,228,353 B1 | 6/2007 | Franceschelli, Jr. et al. |
| 7,350,149 B1 | 3/2008 | Franceschelli, Jr. et al. |
| 2004/0073675 A1 | 4/2004 | Honma et al. |
| 2005/0165868 A1 * | 7/2005 | Prakash ............... 707/204 |
| 2007/0198728 A1 | 8/2007 | Franceschelli, Jr. et al. |

OTHER PUBLICATIONS

U.S. Appl. No. 10/109,036, filed Mar. 28, 2002, Franceschelli et al., entitled "Generic Mechanism for Reporting on Backups."

* cited by examiner

BACKUP REPORTING FRAMEWORK GRAPHICAL USER INTERFACE

CROSS REFERENCE TO RELATED APPLICATIONS

This application is a continuation of U.S. patent application Ser. No. 10/109,013, filed Mar. 28, 2002, now U.S. Pat. No. 7,350,149 the contents of which are incorporated herein by reference.

STATEMENT REGARDING FEDERALLY SPONSORED RESEARCH

Not Applicable.

FIELD OF THE INVENTION

The present invention relates generally to backup reporting, and more specifically to a framework which permits the backup reporting interface to be available on a user's computer which may be located remotely from the server performing the backup operations.

BACKGROUND OF THE INVENTION

As is known in the art, computer systems that process and store large amounts of data typically include one or more processors in communication with a shared data storage system in which the data is stored. The data storage system can include one or more storage devices, such as disk drives. To minimize data loss, the computer systems can also include a backup storage system in communication with the primary processor and the data storage system.

Known backup storage systems can include a backup storage device (such as tape storage or any other storage mechanism), together with a system for placing data into the storage device and recovering the data from that storage device. To perform a backup, the host copies data from the shared storage system across the network to the backup storage system. Thus, an actual data file can be communicated over the network to the backup storage device.

The shared storage system corresponds to the actual physical storage. For the host to write the backup data over the network to the backup storage system, the host first converts the backup data into file data, i.e., the host retrieves the data from the physical storage system level, and converts the data into application level format (e.g. a file) through a logical volume manager level, a file system level and the application level. When the backup storage device receives the data file, the backup storage system can take the application level data file, and convert it to its appropriate format for the backup storage system. If the backup storage system is a tape-based device, the data is converted to a serial format of blocks or segments.

The EMC Data Manager (EDM) is capable of such backup and restore over a network, as described in numerous publications available from EMC of Hopkinton, Mass., including the EDM User Guide (Network) "Basic EDM Product Manual." An exemplary prior art backup storage architecture in which a direct connection is established between the shared storage system and the backup storage system is described in U.S. Pat. No. 6,047,294, assigned to assignee of the present invention, entitled Logical Restore from a Physical Backup in Computer Storage System, and incorporated herein by reference.

For large databases, tape-based data backup and restore systems, which are well known in the art, can be used. In general, files, databases and the like are copied to tape media at selected times. Typically, data is periodically backed up to prevent the loss of data due to software errors, human error, and hardware failures. Upon detection of an error, in an online database, for example, the backed up data can be restored to effect recovery of the data. While restore refers to obtaining backed up data, data recovery refers to the entire process in which applications can access and use the retrieved data. Transactions since the time of backup can be recreated using so-called redo logs. One disadvantage associated with the above backup reporting mechanism, is that the interface to the report function is only available locally, that is on a system resident on the backup machine.

It would, therefore, be desirable to overcome the aforesaid and other disadvantages by providing a backup reporting framework which display the reporting interface on a machine which is located remotely from the backup server machine, and to do so in a secure manner.

SUMMARY OF THE INVENTION

A backup reporting framework Graphical User Interface (GUI) is presented. The framework comprises a combination of components that make it possible to display the Reporting GUI to the user on the user's desktop. The framework includes three main components, a server component, a Web Accessible GUI (WAG) server middleware component, and a monitor server middleware component. The Server Component provides the mechanisms to install and launch the WAG and to start the GUI or Command Line Interface (CLI) interaction with the Middleware Components. The WAG Server Middleware component provides a mechanism for the client application to interact with the server. The WAG Server component gives the client side applications access to data resident on the server and allows for command and control from the client side. The monitor server middleware component also provides a mechanism for the client application to interact with the server. It gives the client side application access to data resident on the server and allows for command and control from the client side. The middleware allows the GUI to get data about the current state of backup, and to display the information graphically. The framework also permits a user to take action on a portion of a report through the GUI.

In accordance with another aspect of this invention, the backup reporting framework includes a computer program medium having computer readable code thereon for providing the combination of components for displaying a WAG to the user on the user's desktop. The computer readable medium includes instructions for providing a server component which installs and launches the WAG on a remote system, instructions for providing a WAG server which permits a client application to interact with the server and instructions for providing a monitor server which allows the user to retrieve data about the state of a process and to display the information graphically through the GUI. The computer readable media may further include instructions for permitting a user to take actions on a portion of the report without accessing additional GUI screens.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
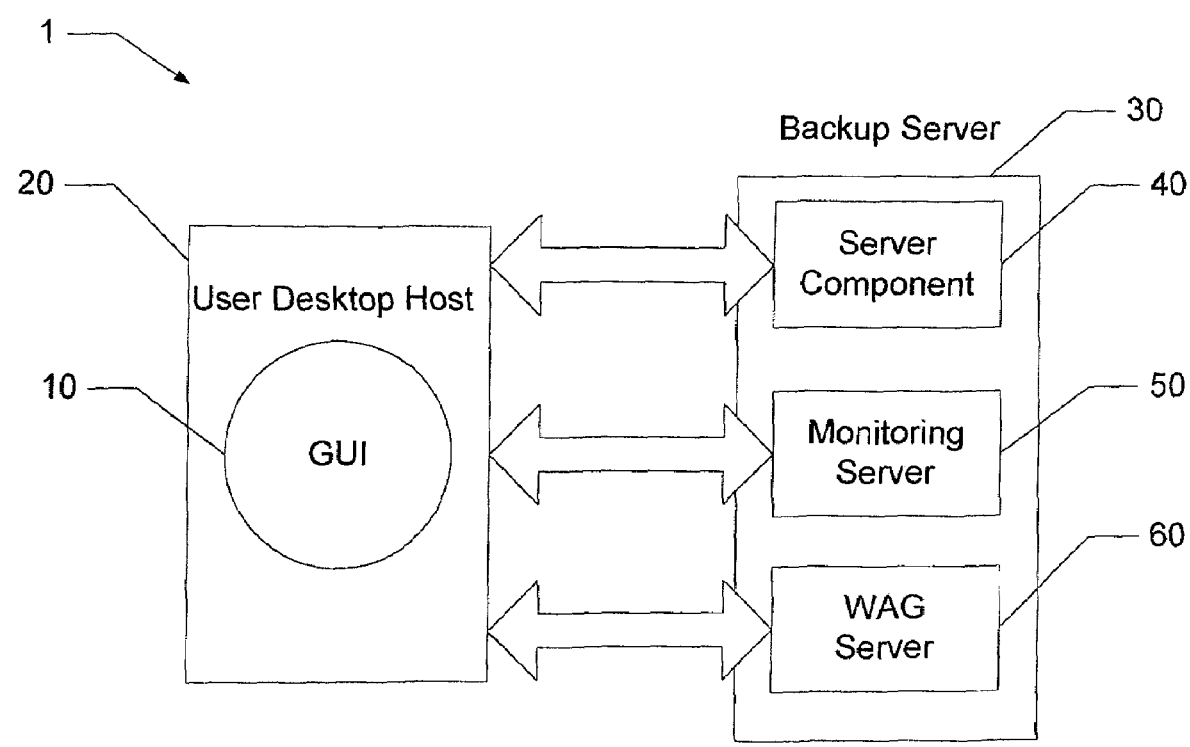
FIG. 1 is a block diagram of the backup reporting framework GUI of the present invention.

A backup reporting framework Graphical User Interface (GUI) is presented. Referring to FIG. 1, a block diagram of the framework 1 is shown. The framework comprises a combination of components that make it possible to display the Reporting GUI 10 to the user on the user's desktop computer 20. The framework 1 includes three main components which are resident on a backup server 30. The three main components include a server component 40, a monitoring server middleware component 50 and a web accessible GUI (WAG) server component 60. The three components typically reside on a backup server 30, and provide the reporting GUI 10 to a remote user on the remote user's system 20. While three components are shown and described it should be appreciated that additional components may also be incorporated as part of the framework.

Figure 2:
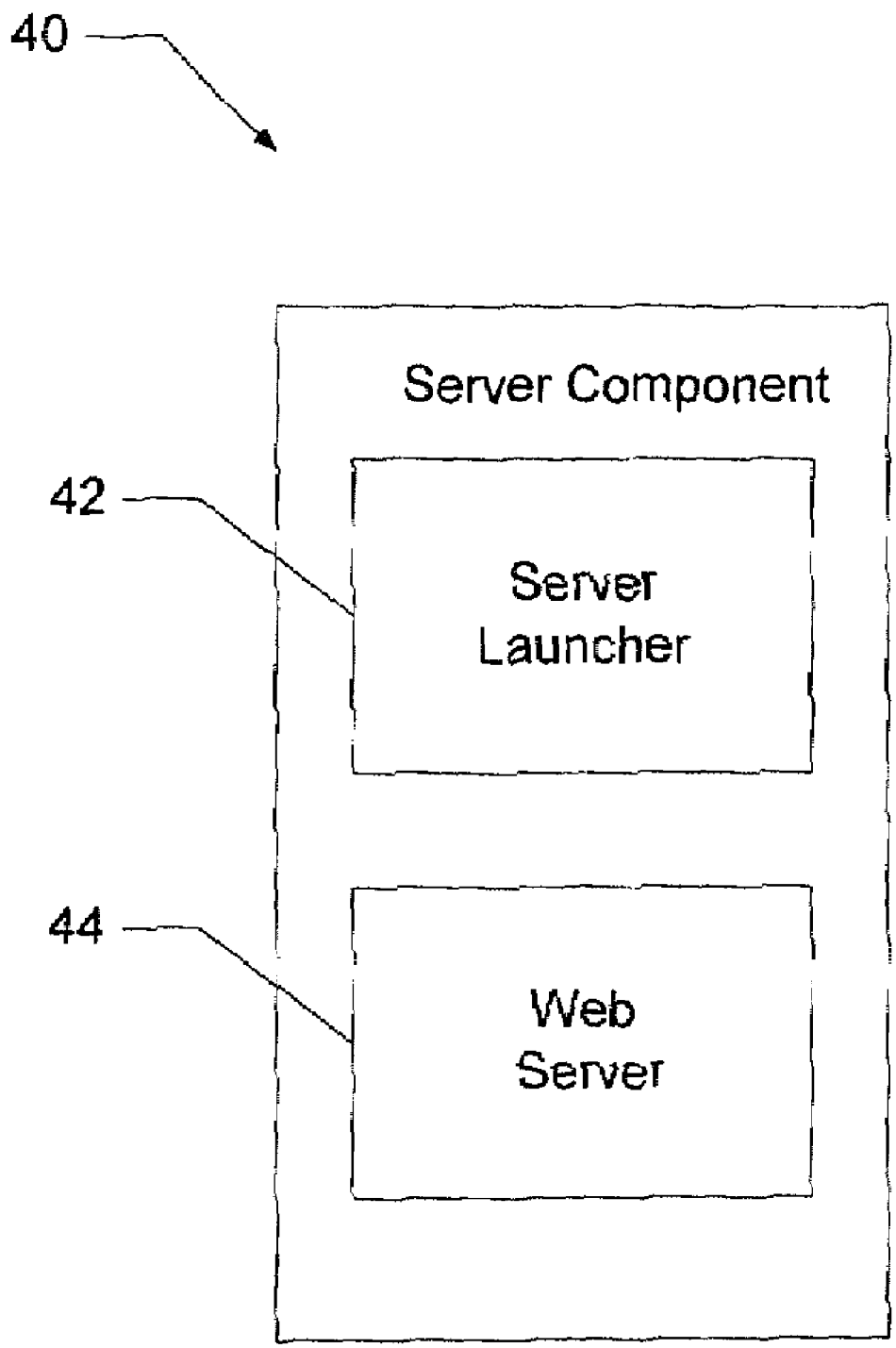
FIG. 2 is a block diagram of the server component.

Referring now to FIG. 2, a block diagram of the server component 40 is shown. The server component 40 provides the mechanisms to install and launch the Web Accessible GUI for use by a remote user. The server component 40 includes two subcomponents, a server launcher subcomponent 42 and a web server subcomponent 44. These subcomponents handle all the operations necessary to start the GUI or CLI's interaction with the monitoring server middleware component 50 and the WAG server middleware component 60. The server launcher subcomponent 42 and the web server subcomponent 44 are started by the operating system at boot time.

The server launcher subcomponent 42 is a persistent process used to create new connections and to authenticate username/password pairs for each GUI or CLI accessing the backup server 30. The server launcher subcomponent 42 is responsible for providing new RMI WAG server processes 60 for each GUI or CLI that connects to it. The connection requires a username and password that is authenticated by the Security Middleware 65 and used to obtain a User object. If the connection is successful, it will determine a unique name for the new server, start up the server (telling it what name to call itself), and pass the unique name along with the User object back to the GUI or CLI requesting access.

The Server Launcher subcomponent 42 is further responsible for starting a new RMI WAG Server 60 for each GUI or CLI requesting backup services, and for making sure a Monitoring Server exists that can provide monitoring data in the correct locale. If a request for a monitoring server 50 comes in, the server launcher 42 will determine if a running monitoring server exists to support the locale or if a new Monitoring Server 50 must be launched. The server launcher 42 will accept a username and password, authenticate it, launch a private RMI WAG Server with a unique name, and return the User object and the name of the private RMI WAG Server. The server launcher 42 will accept a locale and return the name of a Monitoring Server 60 appropriate for the locale.

Figure 3:
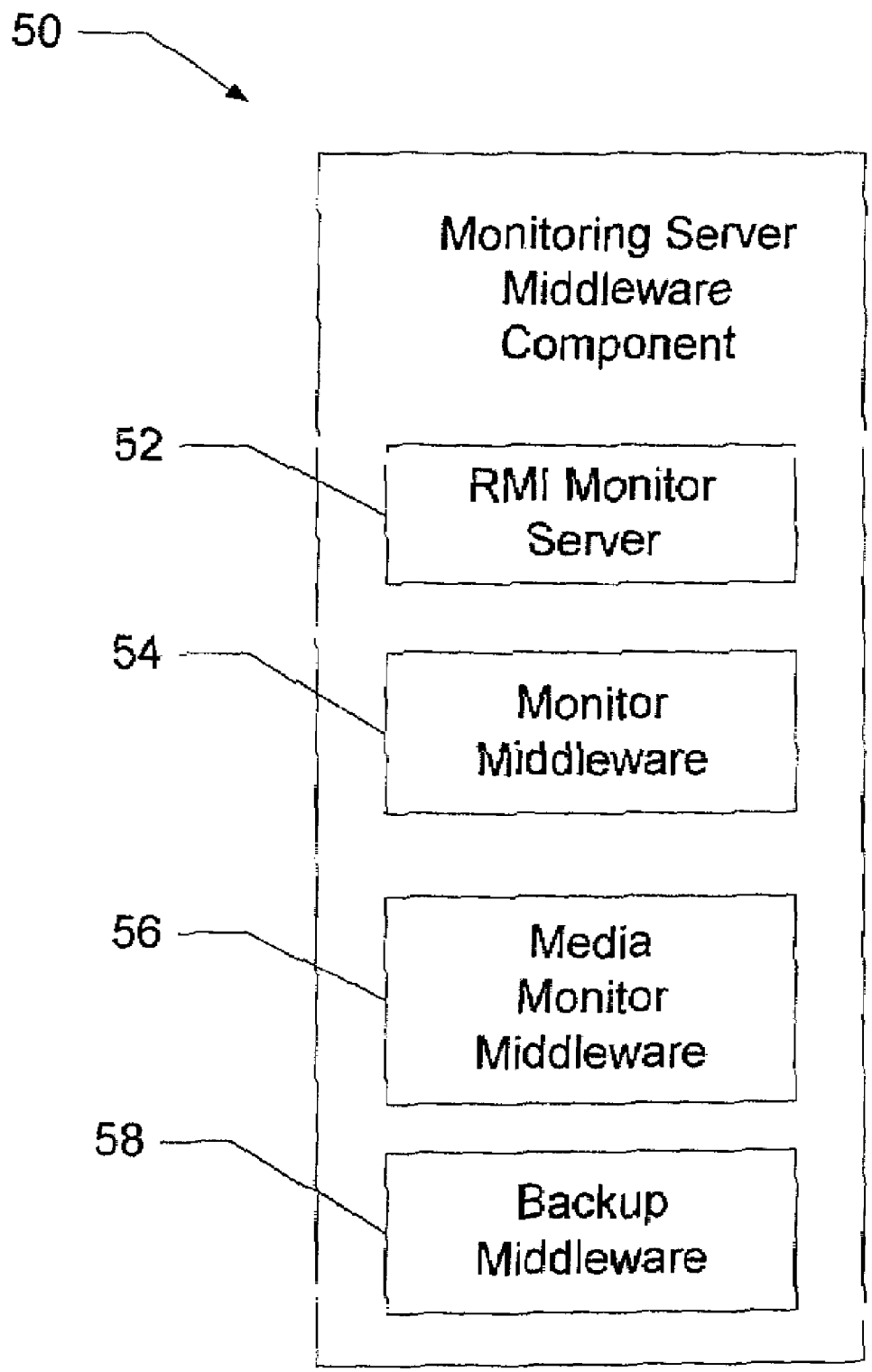
FIG. 3 is a block diagram of the monitoring server middleware component.

Referring now to FIG. 3, a block diagram of the monitoring server middleware component 50 is shown. The monitor server middleware component 50 provides the mechanism for the client application to interact with the backup server 30. The monitoring server middleware component 50 gives the client side application access to data resident on the server and allows for command and control from the client side. The monitoring server middleware component 50 allows the GUI 10 to get data about the current state of backup operations and results, and to display the information graphically on the user's remote system. The monitoring server middleware component 50 includes the following subcomponents: an RMI Monitor server subcomponent 52, a Monitor Middleware subcomponent 54, a Media Monitor Middleware subcomponent 56 and a Backup Middleware subcomponent 58. The middleware provides monitoring capabilities for all object types generically to help minimize the cost of creating new object types to monitor, and reuse code throughout the different object types. The objects passed to/from the GUI and CLI are kept at a high level and are self-describing. The GUI can simply get a monitor object and graphically display it without knowing the object type or the details of the individual object itself (i.e. workitem, lu, drive).

The public interface to the monitoring server middleware component 50 is through the RMI Monitor Server 52. This subcomponent acts as a dispatcher to the other subcomponents that provide the functionality required by the monitoring server middleware component 50. This is the gateway for which all client/server communications occurs.

The monitoring server middleware component 50 is responsible for creating a server-side (business monitor object) model of all library units, associated drives, clients and workitems upon startup. ListenerObjects are started in a separate thread at startup. This object listens to all of the notifies which it is registered to. Upon notification, the server side model is updated with changes. There are two models: one on the server side, and another on the client side (containing Monitorable objects), which are kept in synch by GUI polling.

The client GUI polls the monitoring server middleware component 50 for updates with the timestamp of the last update via the getMonitorUpdates method. The monitoring server middleware component 50 traverses the model looking for objects which have changed since the timestamp passed in by the client and sends back the changed Monitorable objects with necessary information for the GUI to display. The client side traverses its model in the background, and updates it with the modified objects. The GUI update is triggered upon the data model changing.

Each of the Monitor subcomponents (Backup and Media) provides access to the monitor data as well as the displayable definitions of each type of monitor object. The monitor definition specifies what a monitor object of that particular type is, how it is to be displayed and updated. Each monitor definition also includes what actions can be performed on these monitor objects. These actions may request more user input or go directly through to the subcomponent to perform the action on the selected result objects. Each of these subcomponents uses the Java Native Interface (JNI) to access the backup operation API's written in C and/or C++.

Figure 4:
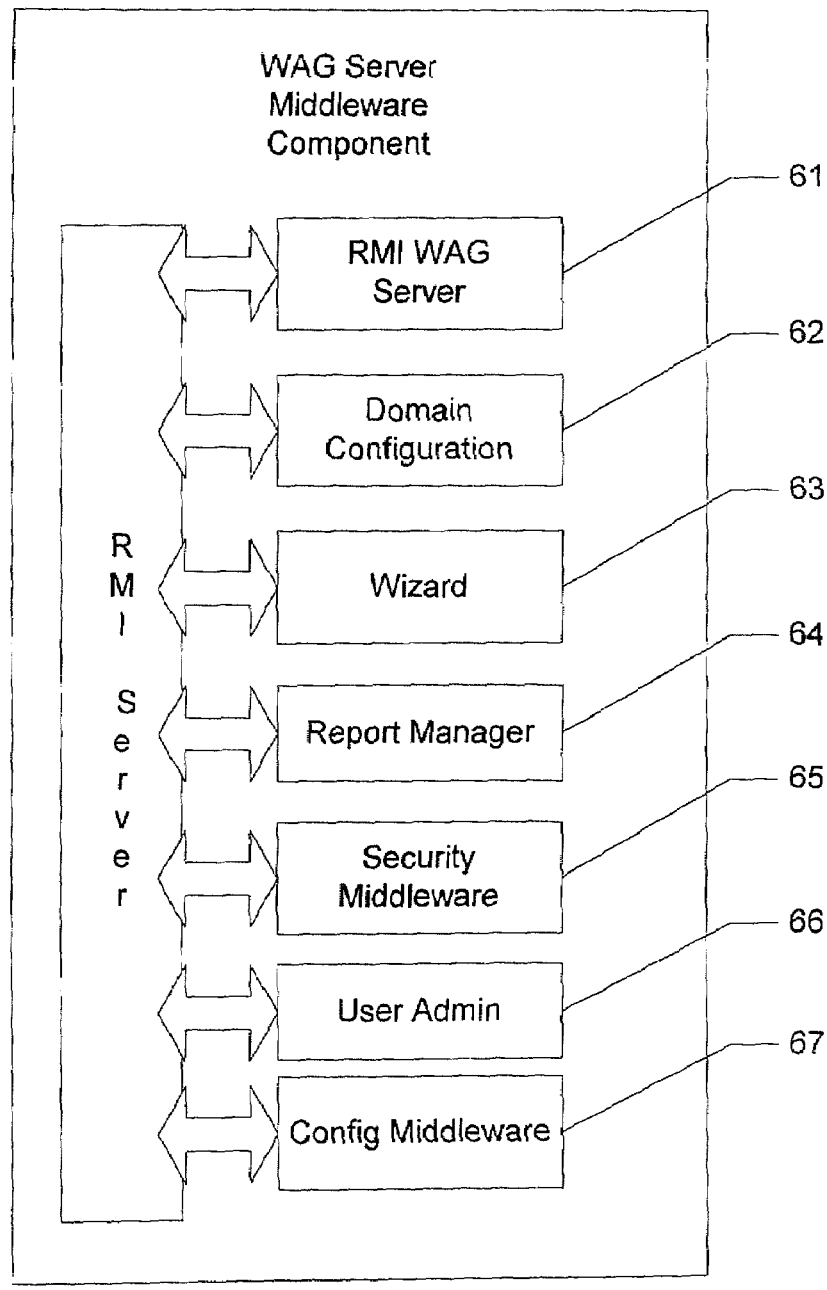
FIG. 4 is a block diagram of the WAG server middleware component.

Referring now to FIG. 4 a block diagram of the WAG Server Middleware component 60 is shown. This component 60 provides a mechanism for the client application to interact with the server. This component 60 also gives the client side application access to data resident on the server and allows for command and control from the client side.

The WAG Server Middleware component 60 allows the GUI or CLI to access and change configurations, access Wizard interfaces to facilitate activities on the backup server, as well as access, change, and execute reports of several types. The WAG Server Middleware component 60 provides groupings of common functionality across several types of activities. This allows the WAG Server Middleware component 60 to effectively reuse code and achieve maximum maintainability. The Middleware provides the major functionality of abstracting very complicated business objects into generic GUI objects where the GUI or CLI clients need not understand the behavior of an object in order to display or allow users to interact with it. This methodology affords the interactive nature of the GUI and CLI clients to be very simple, abstract, and uniform. The WAG Server Middleware component 60 is made up of the following major subcomponents: an RMI WAG Server subcomponent 61, a Domain Configuration subcomponent 62, a Wizards subcomponent 63, a Reporting subcomponent 64, a Security subcomponent 65, a User Administration subcomponent 66, and a Domain Administration subcomponent 62.

The public interface to the WAG Server Middleware component 60 is through the RMI WAG Server 61. This is the gateway of all client/server communications. The RMI WAG Server subcomponent 61 is the gateway for the GUI and CLI clients to communicate with the WAG Server Middleware component 60. The WAG RMI Server 61 provides the methods that communicate between the GUI and CLI client to the WAG Server. It uses the Java RMI (Remote Method Invocation) interface for communications. There is one WAG RMI Server per GUI or CLI to handle the requests.

The Domain Administration subcomponent 62 is responsible for the creation, deletion, and modifying properties of the domain setup parameters. This includes setting a host as the domain master, domain participant, or individual host (not a domain participant).

The Wizard subcomponent 63 is responsible for building, distributing, and collection information from Wizard panels. It supplies the Wizard panels, and allows generic access to the standard behaviors of a Wizard, such as Next, Prev, Finish, Cancel, and Help.

The Reporting subcomponent 64 provides the generic capability to retrieve, save, modify, and delete reports at a high level. It also provides the print, email, save, and auto-schedule functionality for report results. Each of the report portions (Backup, Events, and Media) provides access to the report data as well as the report definitions for each type of report. The report definition specifies what a report of that particular type is, how it gets its results, and how the results are to be displayed. Each report definition also includes what actions can be performed on the results of the report. These actions may request more users input or go directly through to the subcomponent to perform the action on the selected result objects.

The Security subcomponent 65 is responsible for authenticating the username and password and returning a User object. This User object will provide the means to determine what privileges the GUI or CLI should grant the user. The other purpose for the Security subcomponent 65 is to audit the actions performed by the user.

The User Administration subcomponent 66 is responsible for the creation, deletion, and modifying properties of users of the Web Accessible GUI.

The Configuration subcomponent 67 is responsible for retrieval and modification of configurable parameters. This subcomponent 67 has two parts: Backup Configuration and RASD Configuration. The Backup Configuration portion is responsible for the retrieval, locking, modifying, and refreshing of the Backup Configuration of the EDM, including detailed configuration. It provides a way for multiple users to view the configuration and serializes modifications to the backup configuration. The RASD Configuration portion is responsible for the retrieval, locking, modifying, and refreshing of the RASD Configuration of the EDM.

An additional feature provided the presently disclosed backup reporting framework is the ability of a user to manage the day to day operations of the backup server from the reporting GUI. This feature allows the user to take actions by accessing a certain portion of the report, without having to go to other applications or interfaces.

By way of the present invention, the user can take actions based on one or more rows of a report. For example, the user may run a report on the backup operations that took place overnight. One of the columns of the report indicates the status (pass or fail) of the backup operation. From the report, the user can select the failed backup operation and chose to restart the operation. The actions the user can take from the report are specific to the report type. For Example backup reports would only allow the user to perform actions specific to the back up such as restart, queue, dequeue etc. Similarly, media reports would allow the user to perform actions based on the media repots such as eject, mount media, and the like. Event reports would allow the user to acknowledge events and to unacknowledged events. The actions are also sensitive to the data contained in the report such that, for example, a backup operation that didn't fail could not be restarted.

Figure 5:
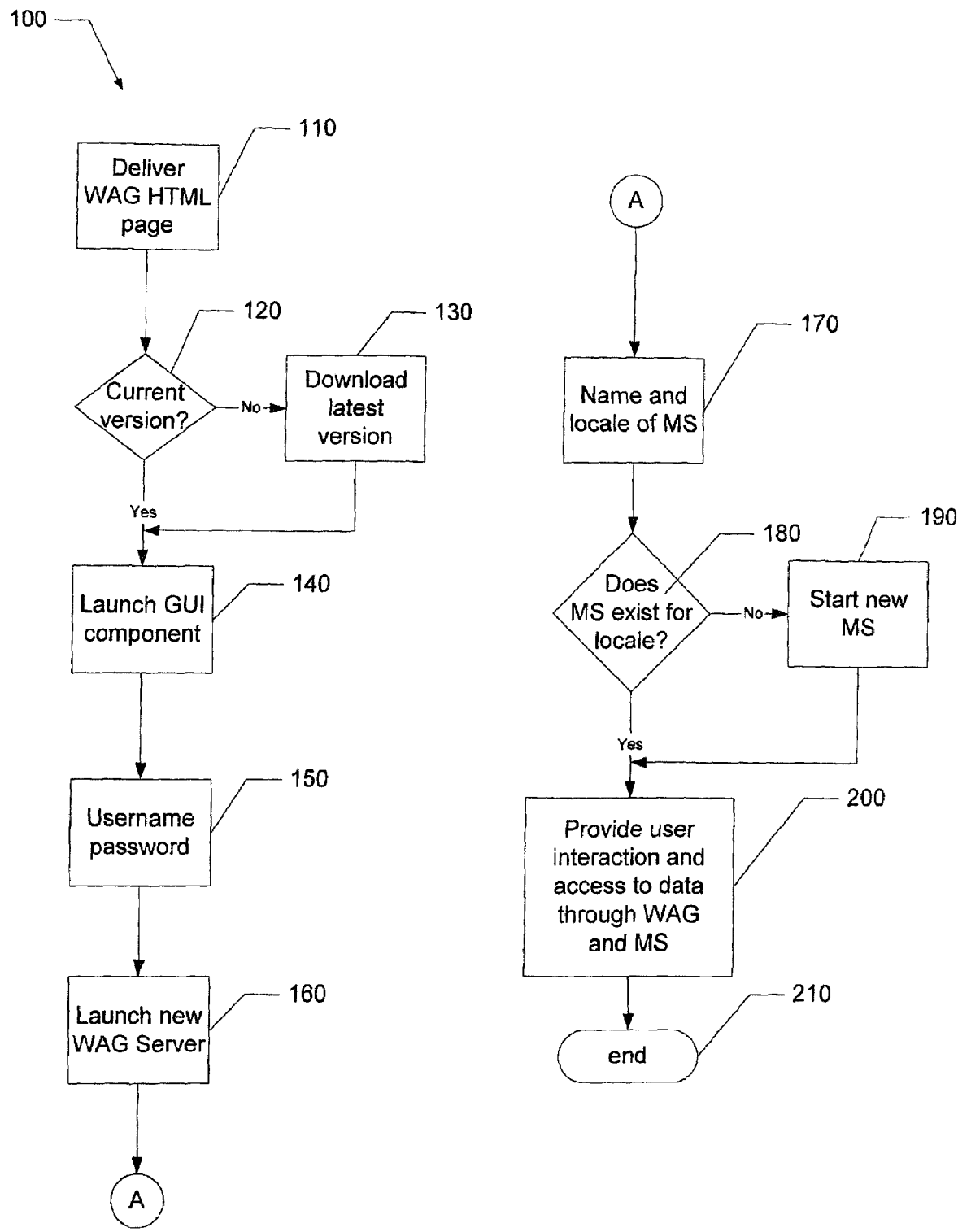
FIG. 5 is a flow diagram of presently disclosed method.

Having described the various components that comprise the present invention, the method of providing the backup reporting framework GUI will now be described. A flow chart of the presently disclosed method is depicted in FIG. 5. The rectangular elements, are herein-denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The process 100 begins at step 110 wherein in order to launch the GUI from the web, the Web Server delivers a WAG Hyper Text Markup Language (HTML) page to the Web Browser on the user's desktop host. This page will reference the WAG Java Language Launcher Protocol (JNLP) file. A JNLP file is a file that the Java Web Start application uses to launch Java applications from a Web Browser. This file specifies the Jar files, security levels, and the command line arguments necessary to launch the WAG GUI application.

In order to understand the JNLP file, the user will have had to install Java Web Start on their desktop. The Web Server will provide a page to download the Java Web Start application to the desktop. Once installed, the client browser will understand the JNLP extension and launch Web Start with the file.

Java Web Start will determine if the desktop host has the current version of the GUI, as shown in step 120. If either the application does not exist or the current installed version is incompatible with the server's version then, as shown in step 130 Web Start will automatically download the latest version from the backup server. This will require the user to accept the signed application in order to perform the download. Once the versions are compatible, step 140 is executed wherein the Web Start will launch the GUI Component.

At step 150 the GUI Component will prompt for a username and password and pass it to the Server Launcher subcomponent for verification. Upon successful login, the Server Launcher subcomponent will launch a new uniquely named Remote Method Invocation (RMI) WAG Server as shown in step 160 and pass the unique name along with the User record back to the GUI Component.

At step 170, the GUI Component will also request the name of the RMI Monitoring Server. This request will include the locale being used by the GUI Component. If the Server Launcher 42 determines a Monitoring Server exists which can handle the given locale, as shown in step 180, the server launcher simply returns the name of the currently running monitor server. If no Monitoring Server is running that supports the given locale, step 190 is executed wherein a new Monitoring Server is started and the name of that server is returned.

At step 200, the remote user is provided access through the WAG and can perform various backup reporting functions such as the generic capability to retrieve, save, modify, and delete reports at a high level. The user also has the ability to print, email, save, and auto-schedule functionality for report results. The remote user is provided access through the Wag to the backup reporting data. The user is also given the ability to perform certain actions based on the report content, and to do so from the report without having to access other applications or interfaces. At step 210 the process terminates.

As described above, the Web Accessible GUI 10 provides a single RMI WAG Server process for each client GUI or CLI invoked by the user. This is necessary since the underlying APIs are not thread safe. Since the Java RMI server architecture will start each RMI method in a separate thread, there is no good way to prevent multiple GUIs or CLIs from creating simultaneous threads without serious performance degradation.

The Web Accessible GUI creates a single RMI Monitoring Server for each locale being used by the clients. The initial Monitoring Server is started under the standard locale. Each client that requests a connection to a Monitoring Server will pass the desired locale to the Server Launcher. If the requested locale does not have a corresponding Monitoring Server, a new server is started for that client locale. This is necessary since the Monitoring Server will be returning displayable strings to the client and these strings are locale-dependent.

However, the WAG Server process will not call any of the JNI methods at the same time in separate threads. The Remote Server process will 'synchronize' these methods so that this does not occur.

There are several processes that have slightly different threading models. The GUI's threading model is to have one thread handle user interaction, events, drawing, etc., and separate threads for retrieving data from the Middleware. When the GUI refreshes the data in a window or retrieve data for the first time, it will start a separate thread to get the results. The main thread will create the window, bring up the window, and draw the window. When the data retrieval thread completes it will load the table with the data. The WAG Server process (Middleware) will have a thread for each request made through the gateway (RMI method).

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of providing a backup reporting framework graphical user interface (GUI), the method comprising:
   delivering a Web Accessible GUI (WAG) page to a web browser resident on a remote system;
   launching a GUI component on the remote system;
   launching a uniquely named Remote Method Invocation (RMI) WAG server;
   associated with the GUI component on the remote system, wherein the uniquely named RMI WAG server is part of a backup storage server;
   providing a monitor server able to provide monitoring data for a locale being used by the GUI component; and
   providing, from the remote system, user interaction with the backup storage server, user control of the backup storage server configuration, user control of the backup storage server operation, and access to data on the backup storage server, said data relating at least in part to the state of a backup operation, through at least one of said uniquely named RMI WAG server and said monitor server.

2. The method of claim 1 wherein said delivering further comprises determining if the remote system has the current version of the GUI.

3. The method of claim 2 further comprising downloading the latest version of said GUI if the current version on the remote system is not the latest version.

4. The method of claim 1 wherein said launching a GUI component further comprises requesting a username/password from a user on said remote system.

5. The method of claim 4 further comprising the step of verifying the username password from the user.

6. The method of claim 1 wherein said providing a monitor server comprises determining if a monitor server exists for the locale of said user, using the monitor server when the server does exist for the user locale and when a monitor server does not exist for the user locale then launching a new monitor server.

7. The method of claim 1 wherein said launching an RMI WAG server includes allowing a user application to interact with at least one of the RMI WAG server and the monitor server.

8. The method of claim 1 wherein said providing a monitor server includes allowing the GUI to get information about the current state of a process.

9. The method of claim 1 wherein said providing a monitor server includes allowing the GUI to display information about the current state of a process.

10. The method of claim 1 wherein said user interaction includes at least one function selected from the group including retrieving reports, saving reports, modifying reports, deleting reports, printing reports, emailing reports, saving reports, and scheduling.

11. The method of claim 1 further comprising allowing a user to take action based on content of a report provided to the user through said GUI.

12. The method of claim 11 further comprising selecting said report from the group including media reports, backup reports, and event reports.

13. A computer readable memory device having computer readable code thereon, including program code comprising:
   instructions for providing a server component associated with a backup storage server, the server component installing and launching a Web Accessible GUI (WAG) on a remote system;
   instructions for providing a uniquely named Remote Method Invocation (RMI) WAG server on the backup storage server and associated with a WAG resident on the remote system, the uniquely named RMI WAG server permitting a client application at the remote system to interact with the backup storage server, control backup storage server configuration, control backup storage server operation, and access data on the backup storage server, said data relating at least in part to the state of a backup; and
   instructions for providing a monitor server associated with said backup storage server, the monitor server providing monitoring data for a locale being used by the GUI component, allowing the GUI to get information about the state of a backup process and display the information graphically, and permitting the client application to interact with the backup storage server.

14. The computer readable memory device of claim 13 wherein said sever component includes at least one subcomponent selected from the group including a server launcher and a web server.

15. The computer readable memory device of claim 13 wherein said monitor server includes at least one subcomponent selected from the group including an RMI monitor server, a monitor middleware component, a media monitor middleware component and a backup middleware component.

16. The computer readable memory device of claim 13 wherein said uniquely named RMI WAG server includes at least one subcomponent from the group including an RMI WAG server subcomponent, a domain configuration subcomponent, a wizards subcomponent, a report manager subcomponent, a security middleware subcomponent, a user administration subcomponent, a backup configuration subcomponent, and a configuration middleware subcomponent.

17. The computer readable memory device of claim 13 further comprising instructions for determining if the remote system has the current version of the GUI.

18. The computer readable memory device of claim 13 further comprising instructions for downloading a latest version of said GUI when the version on the remote system is not the latest version.

19. The computer readable memory device of claim 13 further comprising instructions for requesting a username/password from the user on the remote system.

20. The computer readable memory device of claim 19 further comprising instructions for verifying the username/password from the user.

21. The computer readable memory device of claim 13 further comprising instructions for determining if a monitor server exists for the locale of said user, instructions for using the monitor server when the server does exist for the user locale, and instructions for launching a new monitor server when a monitor server does not exist for the user locale.

22. The computer readable memory device of claim 13 further comprising instructions for performing at least one function selected from the group including retrieving reports, saving reports, modifying reports, deleting reports, printing reports, emailing reports, saving reports, and scheduling.

23. The computer readable memory device of claim 13 further comprising instructions for allowing a user to take action based on content of a report provided to the user through said GUI.

24. The computer readable memory device of claim 13 further comprising instructions for selecting said report from the group including media reports, backup reports, and event reports.

25. A computer readable memory device having computer readable code thereon, the code comprising:
   instructions for providing a server component associated with a backup storage server, the server component installing and launching a Web Accessible GUI (WAG) on a remote system;
   instructions for providing a uniquely named Remote Method Invocation (RMI) WAG server on the backup storage server and associated with a WAG resident on the remote system, the uniquely named RMI WAG server permitting a client application at the remote system to interact with the backup storage server, control backup storage server configuration, control backup storage server operation, and access data on the backup storage server, said data relating at least in part to the state of a backup; and
   instructions for providing a monitor server associated with said backup storage server, the monitor server providing monitoring data for a locale being used by the GUI component, allowing the GUI to get information about the state of a backup process and display the information graphically, and permitting the client application to interact with the backup storage server.

26. The computer readable memory device of claim 25, further comprising instructions for launching on the backup storage server, for each GUI launched on the remote system, a single, uniquely named Remote Method Invocation (RMI) WAG server associated with the respective GUI component on the remote system.

* * * * *